(12) United States Patent  
Fiedler

(10) Patent No.: US 9,680,982 B2  
(45) Date of Patent: Jun. 13, 2017

(54) EMERGENCY COMMUNICATION DEVICE

(71) Applicant: Fibar Group S.A., Poznan (PL)

(72) Inventor: Maciej Fiedler, Poznan (PL)

(73) Assignee: FIBAR GROUP S.A., Poznan (PL)

( * ) Notice: Subject to any disclaimer, the term of this patent is extended or adjusted under 35 U.S.C. 154(b) by 0 days.

(21) Appl. No.: 14/844,937

(22) Filed: Sep. 3, 2015

(65) Prior Publication Data

US 2016/0065721 A1   Mar. 3, 2016

Related U.S. Application Data

(60) Provisional application No. 62/045,504, filed on Sep. 3, 2014.

(51) Int. Cl.
| | |
|---|---|
| *H04W 4/22* | (2009.01) |
| *H04M 1/725* | (2006.01) |
| *H04L 12/28* | (2006.01) |
| *H04L 12/24* | (2006.01) |
| *G08B 25/00* | (2006.01) |

(52) U.S. Cl.
CPC ...... *H04M 1/72541* (2013.01); *G08B 25/008* (2013.01); *H04L 12/282* (2013.01); *H04L 41/082* (2013.01); *H04W 4/22* (2013.01)

(58) Field of Classification Search
CPC ............ H04M 1/72541; H04M 11/04; H04M 2242/04; H04L 12/2814; H04L 12/282; H04L 41/082; G08B 25/008; G08B 25/016; H04W 4/22; H04W 76/007
USPC ............................................ 455/404.1, 404.2
See application file for complete search history.

(56) References Cited

U.S. PATENT DOCUMENTS

| | | | | | |
|---|---|---|---|---|---|
| 6,150,942 | A | * | 11/2000 | O'Brien ................ | A61J 7/0481 340/573.1 |
| 2005/0128068 | A1 | * | 6/2005 | Winick ............... | B60R 25/1004 340/517 |
| 2007/0103317 | A1 | * | 5/2007 | Zellner .................. | G06Q 50/24 340/573.1 |
| 2009/0125708 | A1 | * | 5/2009 | Woodring ........... | G06F 9/44505 713/1 |

(Continued)

*Primary Examiner* — Cong Tran

(74) *Attorney, Agent, or Firm* — McAndrews, Held & Malloy, Ltd.

(57) ABSTRACT

An emergency communication system for use with a home network manager having one or more associated network elements. The system may comprise a processor that may communicate with at least one of the home network manager and the associated network elements, a input interface that may receive a plurality of sequential inputs and/or a management interface that may enable a user to program a plurality of programmable responses to a number of the sequential inputs, wherein each programmable response may include a user-programmable action to be activated via at least one of the emergency communication system, the home network manager and/or the associated network elements when, for example, the input interface receives the number of the sequential inputs, wherein when the input interface receives the number of the sequential inputs, the processor may communicate a corresponding user-programmed action to the at least one of the emergency communication system, the home network manager and/or the associated network elements.

9 Claims, 6 Drawing Sheets

(56) References Cited

U.S. PATENT DOCUMENTS

| | | | |
|---|---|---|---|
| 2013/0113822 A1* | 5/2013 | Putrevu | G09G 5/00 345/619 |
| 2013/0157577 A1* | 6/2013 | Zimler | H04L 12/2821 455/63.1 |
| 2015/0067080 A1* | 3/2015 | Cho | H04W 4/12 709/206 |

* cited by examiner

EMERGENCY COMMUNICATION DEVICE

RELATED APPLICATION(S)

The patent application makes reference to, claims priority to and claims benefit from U.S. Provisional Patent Application Ser. No. 62/045,504 entitled "Emergency Communication Device" filed on Sep. 3, 2014, which is hereby incorporated herein by reference in its entirety.

TECHNICAL FIELD

Aspects of the present disclosure relate to electronic systems and/or networking. More specifically, certain implementations of the present disclosure relate to an automated emergency communication device.

BACKGROUND

Existing methods and systems for providing emergency communication, monitoring or control can be costly, cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for an emergency communication device, substantially as shown in and/or described in connection with at least one of the figures, as set forth more completely in the disclosure and/or the claims.

These and other advantages, aspects and novel features of the present disclosure, as well as details of illustrated implementation(s) thereof, will be more fully understood from the following description and drawings.

DETAILED DESCRIPTION

Figure 1:
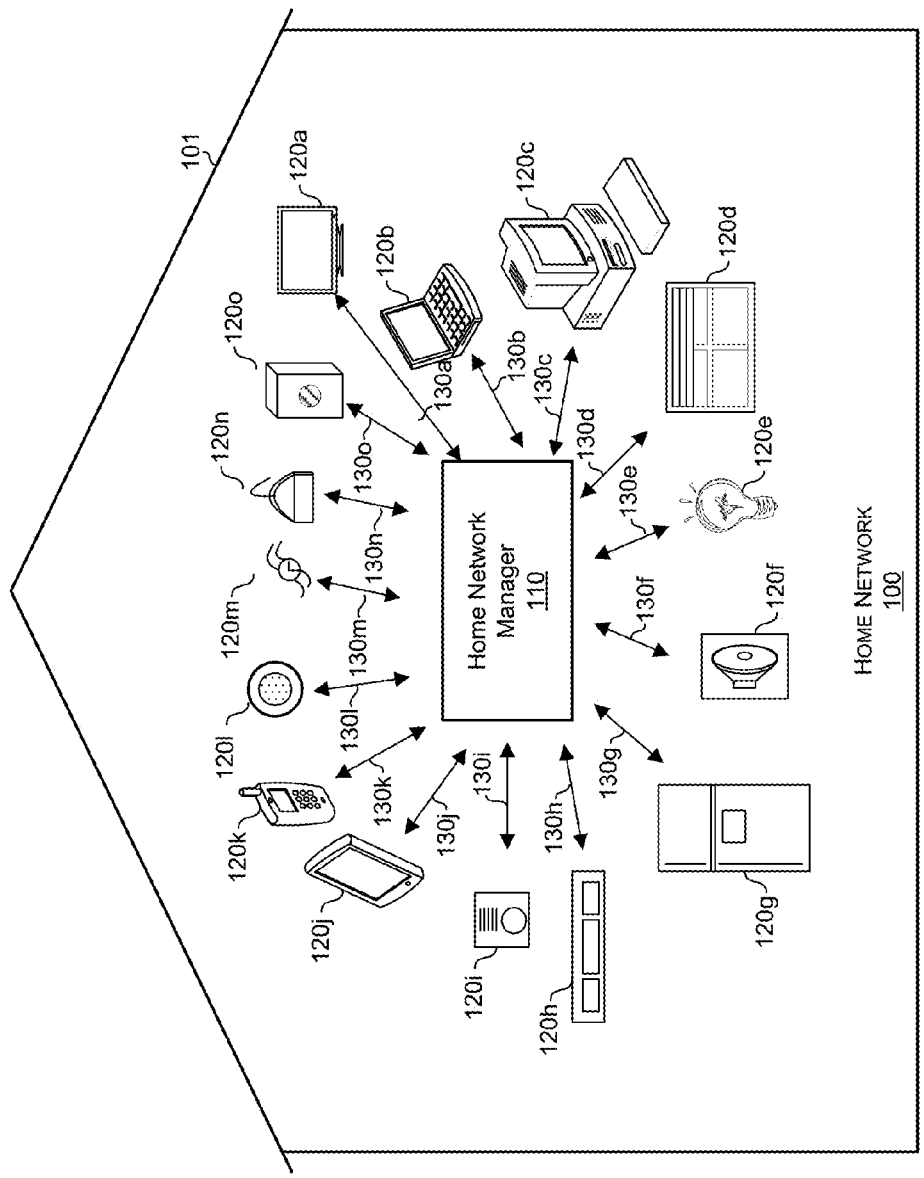
FIG. 1 illustrates an example home network.

Certain implementations may be found in a method and system for an emergency communication device. In one embodiment, an emergency communication system for use with a home network manager having one or more associated network elements may comprise a processor that may communicate with at least one of the home network manager and the associated network elements, an input interface that may receive a plurality of sequential inputs and/or a management interface that may enable a user to program a plurality of programmable responses to a number of the sequential inputs, wherein each programmable response may include a user-programmable action to be activated via at least one of the emergency communication system, the home network manager and/or the associated network elements when, for example, the input interface receives the number of the sequential inputs, wherein when the input interface receives the number of the sequential inputs, the processor may communicate a corresponding user-programmed action to the at least one of the emergency communication system, the home network manager and/or the associated network elements. An emergency communication system may comprise a communication module that may be configurable to communicate the user-programmable action to at least one of the home network manager and the associated network elements. The processor may be configurable to receive data indicative of an operating status of at least one of the home network manager, and/or the associated network elements. The home network manager may include a second interface configurable to enable the user to program the programmable responses.

An emergency communication system may comprise a plurality of external ports programmable through the interface to be at least one of an input port and an output port. One of the plurality of external ports may be coupled to at least one of the home network manager and the associated network elements.

An emergency communication system may comprise a timer to determine an amount of time that the input interface has been activated before the number of the sequential inputs is communicated to the at least one of the home network manager, and the associated network elements.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and/or "module" refer to functions than may be performed by one or more circuits. As utilized herein, the term "example" means serving as a non-limiting example, instance, or illustration. As utilized herein, the terms "for example" and "e.g." introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

FIG. 1 illustrates an example home network. Referring to FIG. 1, there is shown a home network 100.

The home network 100 may correspond to a location 101. The location 101 may, for example, correspond to a residence (e.g., home, apartment) or non-residence premises (e.g., small business, school, library, factory, or the like). In this regard, the home network 100 may, for example, comprise a plurality of home network elements, such as, for example, a plurality of home network elements 120*a*-120*o*. The home network elements (e.g., home network elements 120*a*-120*o*) may, for example, comprise one or more devices, systems, fixtures, appliances, and/or other circuitry.

The home network elements (e.g., home network elements 120a-120o) may comprise, for example, one or more televisions 120a, one or more computers (e.g., laptop computer 120b, desktop computer 120c), one or more personal and/or handheld devices (e.g., tablet 120j, mobile phone 120k, smart watch 120m), one or more multimedia devices and/or components (e.g., speakers 120f), one or more structural fixtures (e.g., windows/window blinds 120d, smart watch), one or more lighting and/or electrical fixtures 120e, one or more appliances (e.g., refrigerator 120g), one or more environmental sensory devices 120h (e.g., thermometers, humidity meters), and/or one or more security devices 120i (e.g., a smoke detector, a carbon monoxide detector, a security alarm, a motion detector) one or more sensors and/or controller (e.g., intelligent motion sensor 120l, RGBW controller 120n) and/or other devices (e.g., emergency communication device 120o).

The disclosure is not limited to any particular type of a home network. Furthermore, the disclosure is not limited to any particular combination of home network elements. It is to be understood that although the network is referred to as a "home network" throughout the disclosure, the disclosure is not limited in this way. Specifically, the network may comprise any other network that may be operable to control one or more network elements. For example, the network of the disclosure (whether or not referred to as a "home network") may be implemented in a residential, non-residential, commercial, industrial and/or any other setting. Similarly, the network elements may comprise network elements (whether or not referred to as a "home network elements") implemented in a residential, non-residential, commercial, industrial and/or any other setting.

In some instances, the home network 100 may incorporate a home network manager 110. The home network manager 110 may comprise suitable circuitry, interfaces, logic, and/or code for implementing various aspects of the present disclosure. For example, the home network manager 110 may be configured for use in managing, servicing, and/or interacting with one or more home network elements. Although the home network manager 110 is shown in FIG. 1 as a single and separate device, the disclosure is not limited in this way. For example, in some implementations, one or more functions of the home network manager 110 may be provided by one or more home network elements (e.g., providing user interface via tablet 120j and/or television 120a). In an example embodiment of the disclosure, the home network manager 110 may be implemented as a virtual platform, such as, for example, one or more software modules may run on, and/or utilize resources of one or more home network elements (e.g., laptop 120b, desktop 120c).

The home network manager 110 may be configured to communicate with one or more elements (e.g., home network devices, home network elements) in a home network. In an example embodiment of the disclosure, the home network manager 110 may be operable to communicate with one or more devices and/or systems that may be external to a home network, using, for example, optical, wired and/or wireless communication links.

Although the home network manager 110 is illustrated as a single device, the disclosure is not limited in this way. For example, the home network manager may comprise one or more home network manager that may each interact with one or more home network elements (e.g., home network elements 120a-120o). In an example embodiment of the disclosure, each of the one or more home network managers may be associated with particular one or more home network elements. In another example, one or more of the one or more home network managers may be associated with any one or more home network elements (e.g., home network elements within range of a particular home network manager, with best communication path).

In an example embodiment of the disclosure, the home network manager 110 may be implemented in an integrated or a distributed system. An integrated system may be implemented, for example, on one computer, server, machine or device, where the integrated system may be configured to perform some or all of the functions, features and/or operations of the home network manager 110 as described herein. A distributed system may be implemented with multiple components (e.g., computers, servers, machines and/or devices), where each of the multiple components may be configured to perform some or all of the functions, features and/or operations of the home network manager 110 as described herein. Each function, feature and/or operation may be implemented on one or more of the components of the distributed system. For example, a specific feature, function and/or operation may be implemented only one component of the distributed system or it may be implemented across multiple components of the distributed system.

In an example embodiment of the disclosure, in addition to or instead of the use of one or more home network managers, the home network 100 may comprise one or more master controllers for controlling one or more home network elements. A master controller may be pre-programmed and/or programmable to control one or more home network elements. A master controller may comprise, for example, a remote controller.

Although the disclosure may refer to a single home network manager, it is to be understood that the disclosure is not limited in this way. For example, the home network manager may comprise one or more home network managers that individually and/or in the aggregate may be implemented as integrated and/or a distributed system.

The home network manager 110 may interact with one or more of the home network elements 120a-120o via corresponding links 130a-130o, which may be supported by the home network manager 110 and/or the corresponding home network element(s). For example, the links 130a-130o may be implemented and/or configured to operate using a wireless protocol, such as, for example, a Z-wave protocol. In an example embodiment of the disclosure, the home network 100 may be implemented as Z-Wave network. However, the disclosure is not limited in this way. For example, the home network 110 may comprise one or more wired and/or wireless links and/or protocol. Wireless links and/or protocols, may comprise, for example, WPAN (e.g., Bluetooth or ZigBee), low power links (e.g., Bluetooth LE (BLE), Bluetooth Smart, iBeacon), near field communication protocols (e.g., NFC) and/or WLAN (WiFi/802.11) protocols and/or any other wireless links and/or protocols suitable for implementation consistent with the disclosure. Wired protocols and/or links may comprise, for example, Ethernet, Universal Serial Bus (USB), and/or any other wired links and/or protocols suitable for implementation consistent with the disclosure.

In an example embodiment of the disclosure, home network manager 110 may interact with one or more home network elements (e.g., home network elements) directly and/or indirectly. For example, the home network manager 110 may interact with one or more home network elements directly through a corresponding link (e.g., wireless, wired link/connection).

In another example, the home network manager 110 may interact with one or more home network elements indirectly though, for example, a converter (e.g., global cache). In this regard, the home network manager 110 that supports one or more particular network interfaces and/or other interfaces (e.g., USB) may be operable to interact with a particular network element (and/or another device) that may otherwise be incompatible with one or more of the one or more particular network and/or other interfaces supported by the home network manger 110. The interaction may be achieved though, for example, a converter and/or a translator. The converter and/or the translator may each comprise suitable logic, circuitry, interfaces, and/or code that may be operable to facilitate communication between a home network manager (e.g., the home network manger 110) and a home network element (home network elements 120a-120o).

In another example, the home network manager 110 may interact with one or more home network elements indirectly though, for example, other network elements. In this regard, the home network manager 110 may interact with one or more home network elements on, for example, a mesh network. An example mesh network (not shown) may facilitate communication (e.g., transmission of messages, signals, data frames) to and/or from the home network manager (e.g., the home network manager 110) to and/or from a particular network element where the communication may, for example, pass through one or more other network elements before reaching the particular network element and/or the home network manager.

In an example embodiment of the disclosure, the home network manager 110 may be operable to support one or more communication methods from one or more other home network devices (e.g., home network elements 120a-120o). For example, one or more home network elements may communicate with the home network manager 110 utilizing a particular wireless link and/or protocol (e.g., Z-wave) and/or a particular wired link and/or protocol (e.g., Ethernet), while one or more other home network elements may communicate with the home network manager 110 utilizing a different particular wireless link and/or protocol (e.g., WiFi) and/or a different particular wired link and/or protocol (e.g., USB).

In an example embodiment of the disclosure, the same one or more home network elements may communicate with the home network manager 110 by, for example, using one or more wired and/or wireless links and/or protocols at the same and/or at different times. For example, a particular network element may communicate with the home network manager 110 using a Z-Wave communication protocol for a particular communication and may communicate with the home network manager 110 using a WiFi communication protocol for another particular communication.

In an example embodiment of the disclosure, one or more home network elements (e.g., home network elements 120a-120o) may communicate with one or more home network elements (e.g., home network elements 120a-120o) directly. In this regard, the one or more network elements may utilize one or more communication links (e.g., wireless, wired) (not shown) and/or one or more network interfaces and/or other interfaces without directing (e.g., routing the communication thought, for example, a home network manager (e.g., the home network manger 110). For example, a home network element may be operable to detect existence of one or more other network elements (e.g., on the same and/or different network) and may initiate, send and/or receive communication to and/or from the one or more other network elements.

In an example embodiment of the disclosure, one network element may be out of range of a home network manager and may communicate with one or more other network elements to determine whether the one or more other network elements are within range of a particular (e.g., a home network manager previously within range of the one network element) and/or any network manager. The range detection and/or discovery may continue from one network element to another. For example, a particular home network element may need to communicate through more than one other home network element in order to, for example, communicate with a desired home network element and/or a desired, particular and/or any home network manager (e.g., the home network manager 110). The disclosure is not limited to a communication for a purpose of range discovery/detection. The communication may comprise any type of communication and may be used for a variety of other purposes (e.g., communicating with a different network element, communicating with a home network manager, controlling an out of range device, controlling another network element).

In an example embodiment of the disclosure, one or more home network elements (e.g., home networks elements 120a-120o) may be operable to control one or more other home network elements (e.g., home networks elements 120a-120o) with and/or without intermediary, such as, for example, a home network manager (e.g., home network manager). For example, one or more home network elements may be operable to control one or more other home network elements through an intermediary. In this regard, a particular network element may communicate with an intermediary (e.g., home network manager) in order to communicate with and/or to control another home networks element. An intermediary may comprise one or more devices (e.g., a preprogrammed and/or programmable master controller, home network manager) that may be operable to control one or more network elements. In another example, a particular network element may directly communicate with and/or to control another home networks element.

In an example embodiment of the disclosure, one or more home network elements (e.g. home network elements 120a-120o) and/or other devices that may be operable to communicate on the network (and/or an associated network as described herewith) and/or that may not be operable to communicate on the network but may otherwise be tractable (e.g., GPS, iBeacon, electronic tag), with one or more other network elements, devices and/or a network manager (e.g., home network manager 110) associated with a particular network (e.g., home network 100) (and/or an associated network as described herewith), may communicate with each other, other devices (e.g., on the same network, another network and/or otherwise connected and/or tractable) and/or the network manager, and/or may be operable to determine a precise location of a particular network element, device and/or network manager utilizing various communication protocols and/or interfaces.

For example, one or more network elements (and/or other devices operable on the network, an associated network as described herewith and/or otherwise traceable) may be operable to generate and/or receive information and/or one more signals and/or messages that may be utilized in determining a location of a particular network element, device and/or network manager. In this regard, a near field communication and/or a low power interface protocol (e.g., BLE, iBeacon) may be utilized for communication between the elements, devices and/or network managers. Furthermore, one more tags (e.g., small electronic devices) may be utilized, to facilitate location of particular elements, devices and/or network managers. For example, a network element, device and/or home network manager may generate a signal and/or a message (on the network, on an associated network and/or through a built in, external, portable and/or otherwise attachable tag) that may be received by another network element, device and/or network manager.

In an example embodiment of the disclosure, one or more home network elements, devices and/or manager may cooperate (e.g., exchange information) to, for example, collectively and/or individually determine a precise location of a particular network elements, device and/or network manager based on the received one or more signals and/or messages. As an example only, a particular network element, device and/or home network manager may generate a signal and/or a message that may be received by other network element, device and/or home network device within a particular time frame. The information about the time it took to, for example, receive the particular one or more signals and/or messages (and/or the information gather from the one or more signals and/or messages, such as, for example, signal strength) may be used to determine the precise location (e.g., distance to/from the network element, device, network manager that received the particular one or more signals and/or message) of the particular network element, device and/or network manager.

In operation, the home network manager 110 may be operable to manage a home network (e.g., the home network 100). The home network manager 110 may be utilized, for example, as an interface platform for interacting with various network elements (e.g., the home network elements 120a-120o). In this regard, the home network manager 110 may support establishing and/or configuring one or more communication connections/links (e.g., the links 130a-130o) with the one or more elements of the home network 110. Once established, the connectivity between the home network manager 110 and the home network elements (e.g., network elements 120a-120o) may, for example, be utilized to enable centralized monitoring, control, and/or management of the home network elements, and/or of the home network 100 as a whole. For example, the home network manager 110 may be operable to control operations of certain elements (e.g., turn on television 120a, switch to particular channel(s) at particular days/times, and/or record if recording is supported); monitor environment in the home network, such as by obtaining environmental readings (e.g., temperature, humidity, etc.) via example environmental sensory devices 120h, and may process these readings (e.g., to determine if/when to adjust other home network elements accordingly); adjust one or more example lighting and/or electrical fixtures 120e (e.g., turn lights on or off); lower/raise example window blinds 120d; adjust operations of example appliances (e.g., refrigerator 120g), such as, for example, based on a preconfigured power efficiency/optimization profile; monitor for any indications of a security/safety problem, based on, for example, input from example security devices 120i, and/or act accordingly (e.g., send notifications to users, such as by texting example smartphone 120k, and/or automatically notify authorities, e.g., by dialing '911' and/or contacting preconfigured emergency numbers).

In an example embodiment of the disclosure, the home network manager 110 may provide and/or utilize user interface services in the home network. In this regard, the home network manager 110 may be operable to support use of user interface functions, and/or to generate and/or store information corresponding thereto, which may be utilized to enable interactions between the home network manager 110 and users (e.g., in the home network 100). For example, in some implementations, the home network manager 110 may be configured to generate and/or use a graphic user interface (GUI), for visually displaying information and/or providing interactivity with users (e.g., for providing input thereby). One or more user interfaces may enable configuring the home network manager 110 and/or functions provided by the home network manager 110. In an example embodiment of the disclosure, the one or more user interfaces may enable user interaction with, configuring and/or adjusting other elements in the home network 100 (e.g., elements connected to the home network manager 110).

In an example embodiment of the disclosure, the user interfaces may be provided via one or more other devices that may be communicatively coupled to the home network manager 110. For example, a GUI generated and/or used by the home network manager 110 may be displayed using existing home network elements, such as, for example, television 120a, laptop 120b, tablet 120j, and/or smartphone 120k.

The disclosure is not limited to a single network (e.g., home network 100) and/or a single network manager (e.g., home network manager 110). For example, one or more networks (e.g., home network 100) and/or one or more network managers (e.g., home network manager 110) may be grouped together. The grouping may correspond to one or more locations (e.g., location 101).

In an example embodiment of the disclosure, a network (e.g., home network 100) may be associated with one or more network managers (e.g., home network manager 110). For example, one network manager may be associated with one or more networks (e.g., home network 100) and/or locations (e.g., location 101), In an example embodiment of the disclosure, a grouping of networks may comprise one or more network, network managers and/or locations. The grouping may be programmable and/or configurable. For example, one more networks may be defined, one or more network managers may be assigned per network and/or associated with one or more devices with a network and/or a network manager. In this regard, the information may be shared between the different networks, network managers and/or devices assigned to the different networks and/or network managers. For example, information gathered on one network (e.g., by a network device, through an occurrence of a condition, event, an alarm, and/or other predefined and/or preconfigured condition) may cause the information to be communicated on the same and/or another associated network. In this regard, the information may trigger a condition, an alarm, an occurrence of an event and/or any other predefined and/or preconfigured condition (e.g., operation of a device, network element) on the same and/or another associated network.

In an example embodiment of the disclosure, one or more home network elements (e.g., home network elements 120a-120o) may be configured to provide enhanced functionality, especially in the context of the home network provided by home network managers (e.g., the home network manager 110). For example, rather than utilizing a typical emergency communication device, an enhanced emergency communication device may be utilized, such as to provide enhanced emergency situation detection, activation, communication, control and/or other functionality in a home network (e.g., the home network 100). An example emergency communication device is depicted in and/or described with respect to FIG. 4.

Figure 2:
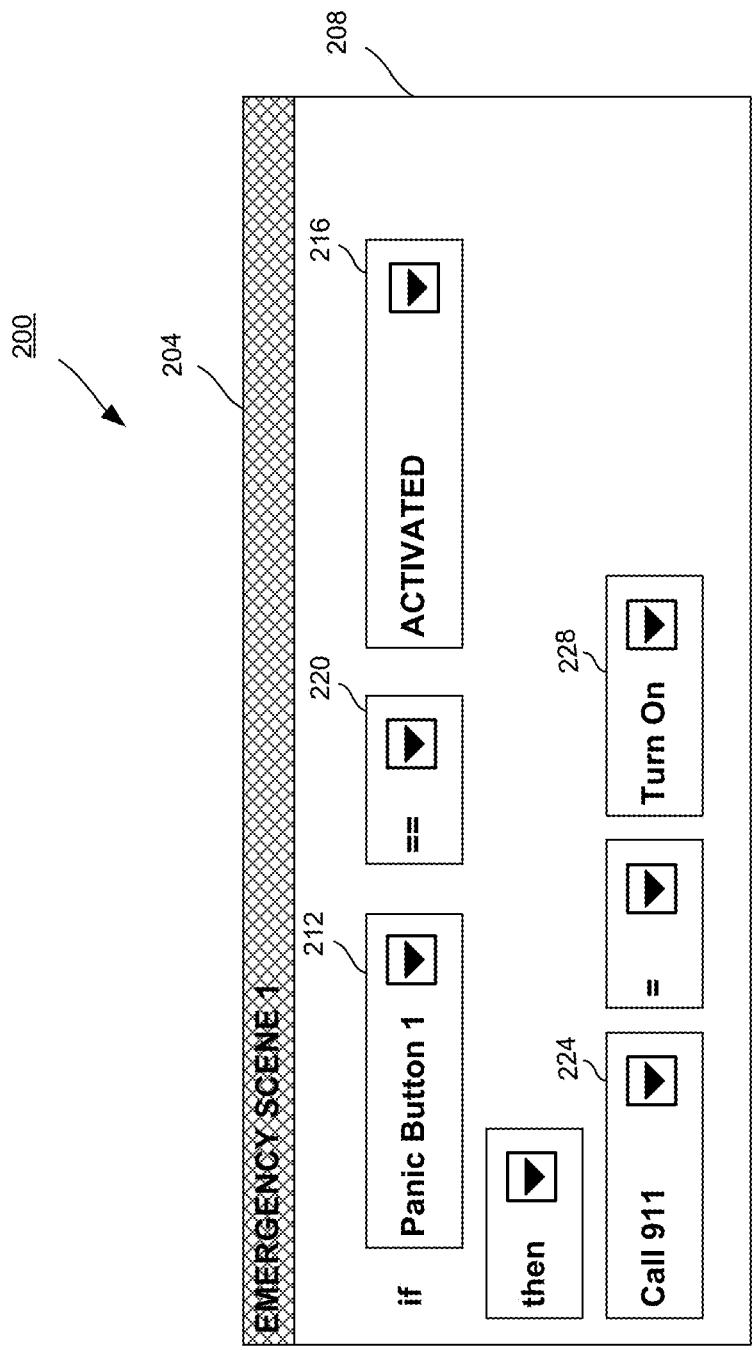
FIG. 2 illustrates an example emergency scene.

FIG. 2 illustrates an example programmable emergency scene or programmable scene 200 for use with the home network manager 110 of FIG. 1. In some embodiments, the home network manager 110 of FIG. 1 may provide an interface 204 that allows a user to program a desirable scene 208. Particularly, the scene may let a user program a plurality of complicated functions between multiple devices included in the home network 100. For example, a scene may be initiated by weather condition, a series of intuitive timers or various sensor/module states. A scene may also include a group of commands sent to a user-defined group of devices. In some embodiments, a command to program and/or control a blind 120d and a lighting fixture 120e such as "open the blinds 50%; and set the lights to 30% brightness" may be entered for a particular room to open one or more blinds 120d at 50% brightness and to set lights 120e to 30% brightness. In some embodiments, one or more scenes may be initiated, for example, by user-defined actions such as "run the scene if the motion sensor is tripped or the room temperature exceeds 27 degrees." In another embodiment, one or more scenes may be initiated within the programmable scene 200, for example, by defining one or more timers, such as "run the scene each day at 8:30 am, and on Monday at 12:15 pm."

In some embodiments, the programmable scene 200 provides a plurality of alternatives to create and configure a scene. For example, in one embodiment, the programmable scene 200 may provide a graphical, block interface to create and configure a scene. Scenes created with the graphical block interface may be intuitive to build. Alternatively, the programmable scene 200 may provide a programming environment in which a user may enter programming instructions, for example, based on a LUA engine, and thus may require some basic programming skills. In such embodiments, when creating scenes based on LUA using LUA scripting language, a user may select an action and characteristics or properties of individual devices from a context menu. For example, in some embodiments, scenes may be added within the programmable scene 200 via programming and/or "if" and "then" logic compositions. In such embodiments, a user may add a scene for activating a sprinkler (not shown) if an exterior humidity drops below 0% for five hours. Thus, in some embodiments, a user may select a predefined parameter and compare the predefined parameter with a threshold above which an action is to be taken, for a predetermined amount of time, for example.

In the embodiment shown in FIG. 2, the programmable scene 200 is titled "EMERGENCY SCENE 1." In the programmable scene 200, the predefined parameter is panic button 1 selected in box 212, and the threshold may be defined in box 216. In this embodiment, the comparison is equality in box 220. For example, if the threshold is set to activated, and if the panic button 1 equals to (or has been) activated, an action (as defined in box 224) is to be taken place. An activation of a panic button may be associated with an interaction with an emergency communication device, such as, for example, the emergency communication device 400 depicted in and/or described with respect to FIG. 4. In this embodiment, the action to be taken is to turn on (in box 228) a call an emergency number action (in box 224). For example, when the panic button 1 has been activated, the home network manager 110 may dial an emergency number, for example, 911, with a pre-recorded message (not shown) indicating help is needed at a pre-recorded address (not shown). In some embodiments, the pre-recorded message may also be time-stamped.

Figure 3:
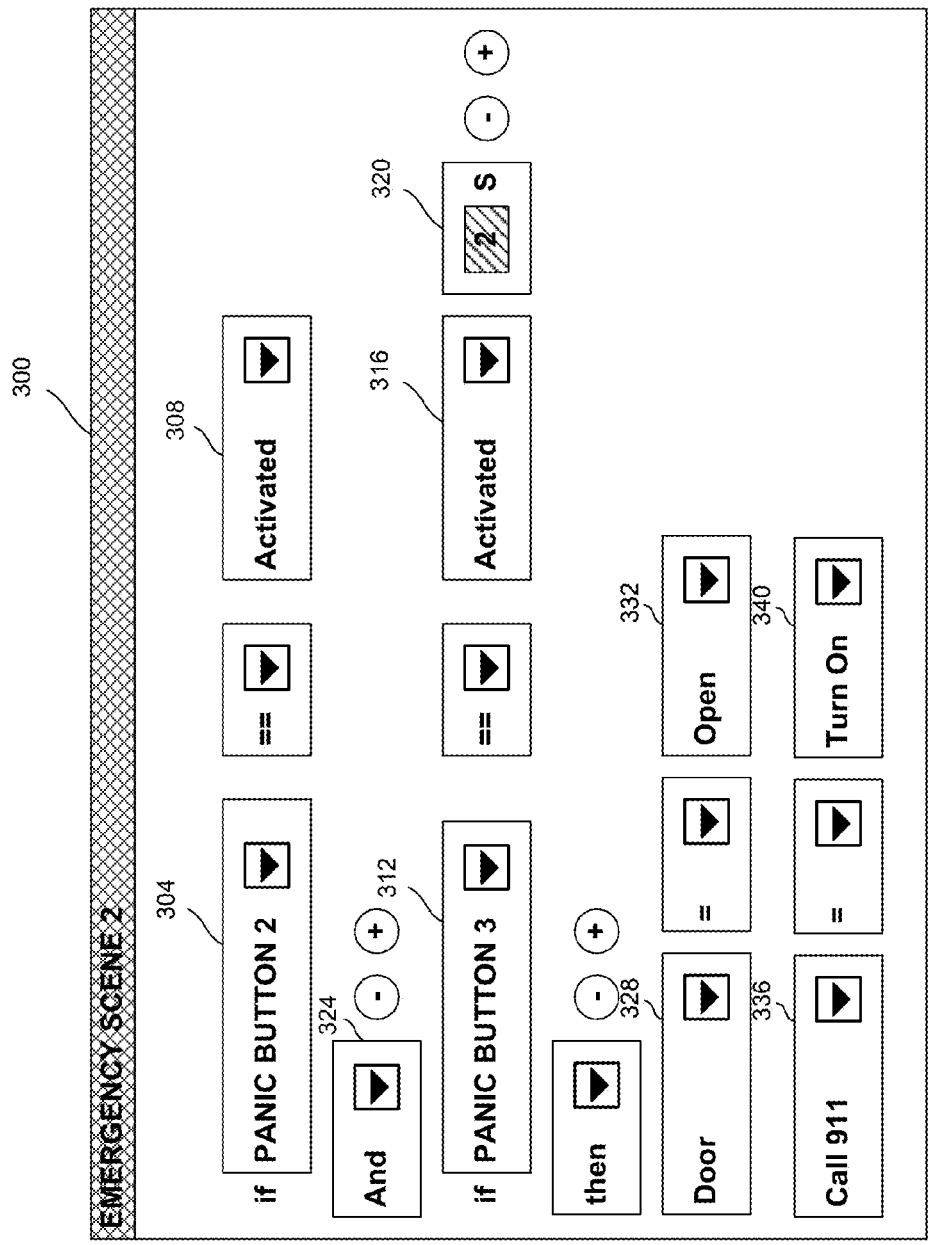
FIG. 3 illustrates a second example emergency scene.

Similarly, FIG. 3 shows a second exemplary programmable emergency scene or programmable scene 300. The second exemplary programmable scene 300 is titled "EMERGENCY SCENE 2." In the second exemplary programmable scene 300, two different conditions have to be met. The first condition includes determining if a panic button 2 selected in box 304 has been activated as defined in box 308. The second condition includes determining if a panic button 3 selected in box 312 has been activated as defined in box 316 for an amount of time in box 320. When both the first condition and the second condition have been met, as defined in box 324, a door as defined in box 328 will be opened as defined in box 332, and an emergency call as defined in box 336 will be placed as defined in box 340. Thus, when both the first condition and the second condition are met, the home manager 110 may open a door and dial an emergency number, for example, 911, with a pre-recorded message (not shown) indicating help is needed at a pre-recorded address (not shown).

Figure 4:
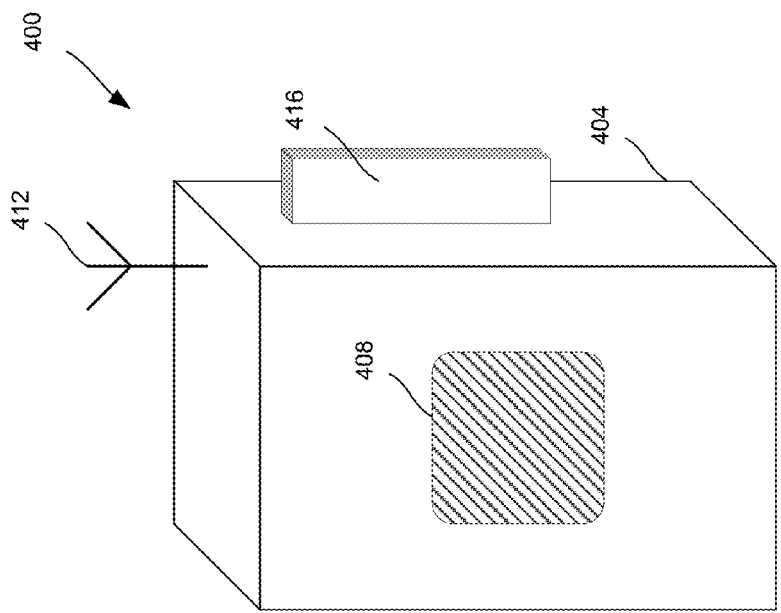
FIG. 4 illustrates an example emergency communication device.

FIG. 4 illustrates an emergency communication device 400 according to one embodiment of the present invention. The emergency communication device 400 may be organically designed and/or configured to communicate an emergency message and/or signal, such as, for example, to a home network manager (e.g., home network manager 110 of FIG. 1) and/or one or more network elements or device(s) (e.g., network elements 120a-102o) directly, via another device and/or via a home network manager (e.g., home network manager 110 of FIG. 1.) In the embodiment shown, the emergency communication device 400 is battery-powered. The emergency communication device 400 may also be charged externally, and thus detached after charge for portable usage. In other embodiments, the emergency communication device may also be externally powered.

The emergency communication device 400 may also generally be miniature and compact in size such that, for example, the emergency communication device 400 may be easily carried by a user to run emergency scenes, such as, for example, those discussed above with respect to FIG. 2 and FIG. 3.

In some embodiments, the emergency communication device 400 may be mounted in any position, for example, beside a bed, or under a desk. Further, the emergency communication device 400 may include, for example, a housing 404 and an emergency activator 408 in the form of, for example, a panic button. Although shown as a rectangular structure, the housing 404 may also be shaped differently depending on applications. For example, the housing 404 may be ergonomically designed to fit a particular user. The housing 404 may one or more additional entry ports (not shown) to provide access to circuitry embedded therein. For example, the entry ports may include ports for external power source, signal source, audio/visual signal disperser, and the like. The housing 404 may be generally waterproof depending on applications. In other embodiments, the emergency activator 408 may include a touch screen button (not shown).

The emergency communication device 400 may include suitable communication circuitry, interfaces, logic, and/or code for implementing various aspects of the present disclosure. More specifically, the emergency communication device 400 may include an optional external antenna 412 to communicate with, for example a network device (e.g., network elements 120a-120o), a home network manager (e.g., the home network manager 110 of FIG. 1), another device on a home network (e.g., network 100), such as, for example, a network element (e.g., network element(s) 120a-

120*o*), an interface device, and/or any other device on the same or a different network. In an example embodiment, the emergency communication device 400 may communicate with a network device, a home network manager and/or other devices using an internal and/or external antenna (not shown).

In some embodiments, the emergency communication device 400 may include a processor (not shown) that, for example, may determine if the emergency activator 408 has been activated, for example, when the emergency activator 408 has been pushed and/or touched. In other embodiments, the processor may also determine an amount of time that the emergency activator 408 has been depressed and/or touched to avoid accidental trigger or pocket call. That is, in some embodiments, the emergency activator 408 has to be activated for a predefined amount of time, for example, 2 seconds, as discussed with respect to FIG. 3. In some embodiments, the emergency communication device 400 may also include a deactivation switch (not shown) that may allow a user to deactivate the emergency communication device 400, or to deactivate an activated emergency activator 408, such that an accidental activation of the emergency activator 408 can be overridden.

The emergency communication device 400 may include a communication module (not shown) to communicate that the emergency activator 408 has been activated for a predefined amount of time, via for example, the external antenna 412. In some embodiments, the communication module may communicate with the home network manager 110, or other home network elements (e.g. 120*a*-120*o*) using a Z-Wave communication protocol, or any other suitable communication protocols. In some embodiments, the communication module may also act as a relay. For example, when the emergency activator 408 of the emergency communication device 400 located in an area of the location 101 of FIG. 1 has been activated, the communication module of the emergency communication device 400 may communicate such activation to a nearby emergency communication device, which relays the activation to the home network manager 110 of FIG. 1.

In other embodiments, the emergency communication device 400 may also include an audio signal generator (not shown) to generate an audible sound such that, for example, emergency personnel may be able to locate the emergency communication device 400. In some embodiments, the audio signal generator may include a high-power driver and/or transducer that may be capable to generate high volume signals. When the emergency communication device 400 includes an audio signal generator, such as, for example, an embedded speaker (not shown), and when the emergency activator 408 is activated, the processor as discussed above may generate an alarm signal to be converted into sound signals through the audio signal generator.

In some embodiments, the emergency communication device 400 may also include a programming interface (not shown) on the housing 404 to allow a user to program an action to take place in the event that the emergency activator 408 is activated. That is, the emergency communication device 400 may be programmed directly with the programming interface. For example, a user may program a duration that an alarm will be set off, a specific emergency action, such as, calling an emergency number, as discussed with respect to FIG. 2 and FIG. 3. In other embodiments, the emergency communication device 400 may also allow a user to program through a programming interface a type of alarm to set off. That is, each emergency communication device 400 may have a unique type of alarm signal.

In some embodiments, the emergency communication device 400 may also be utilized to control and/or program operations of one or more other emergency communication devices 400. In this regard, the emergency communication device 400 may comprise one or more input and/or output terminals (not shown) for controlling and programming one or more emergency communication devices 400 and/or for receiving input from one or more emergency communication devices 400.

An input and/or output port may comprise suitable circuitry, interfaces, logic, and/or code for providing input and/or output to and/or from the emergency communication device (e.g., the emergency communication device 400). In this regard, an input and/or output port of an emergency communication device (e.g., emergency communication device 400) may be configurable as an input port, an output port and/or a hybrid input/output port (e.g., output port with feedback). In an example embodiment of the disclosure, one or more input and/or output ports may be pre-configured as input, output or hybrid input/output ports. In another example embodiment of the disclosure, an input and/or output port may be configured and/or reconfigured (e.g., from a preconfigured or default configuration) as input, output or hybrid input/output port through, for example, a user interface. The user interface may be, for example, provided directly through the emergency communication device 400 (e.g., interface of the emergency communication device) and/or through another device (e.g., home network manager 110).

An input port may be configurable to provide input to the emergency communication device 400 from, for example, other emergency communication devices (e.g., emergency communication device 400). For example, the emergency communication device 400 may receive input, through an input port, from, for example, one or more emergency communication devices 400, sensor device(s) 1201, and the like of FIG. 1.

An output port may be configured to provide output from the emergency communication device 400 to, for example, other emergency communication devices (e.g., emergency communication device 400). For example, the emergency communication device 400 may provide output, through an output port, to, for example, one or more emergency communication devices 400 device(s), sensor device(s) 1201, and the like of FIG. 1.

To allow a user to carry the emergency communication device 400, the emergency communication device 400 may include an optional fastening device 416. In some embodiments, the fastening device 416 may, for example, include a clip. In other embodiments, the fastening device 416 may include, for example, a magnet, a threaded bore, or the like. In yet some other embodiments, the emergency communication device 400 does not include any fastening device. The emergency communication device 400 can be placed or positioned at any desirable locations.

In another example embodiment of the disclosure, an emergency communication device (e.g., the emergency communication device 400) may be operable to activate one or more scenes based one a sequential input. For example, an emergency communication device (e.g., the emergency communication device 400) may be connected to a switch. In this regard, the emergency communication device may activate a particular scene based on, for example, a number of sequential clicks). For example, click once for a "Movie Scene" (e.g., dimming lights, adjusting background settings, home theater settings), click twice for a "Dinner Scene"

Figure 5:
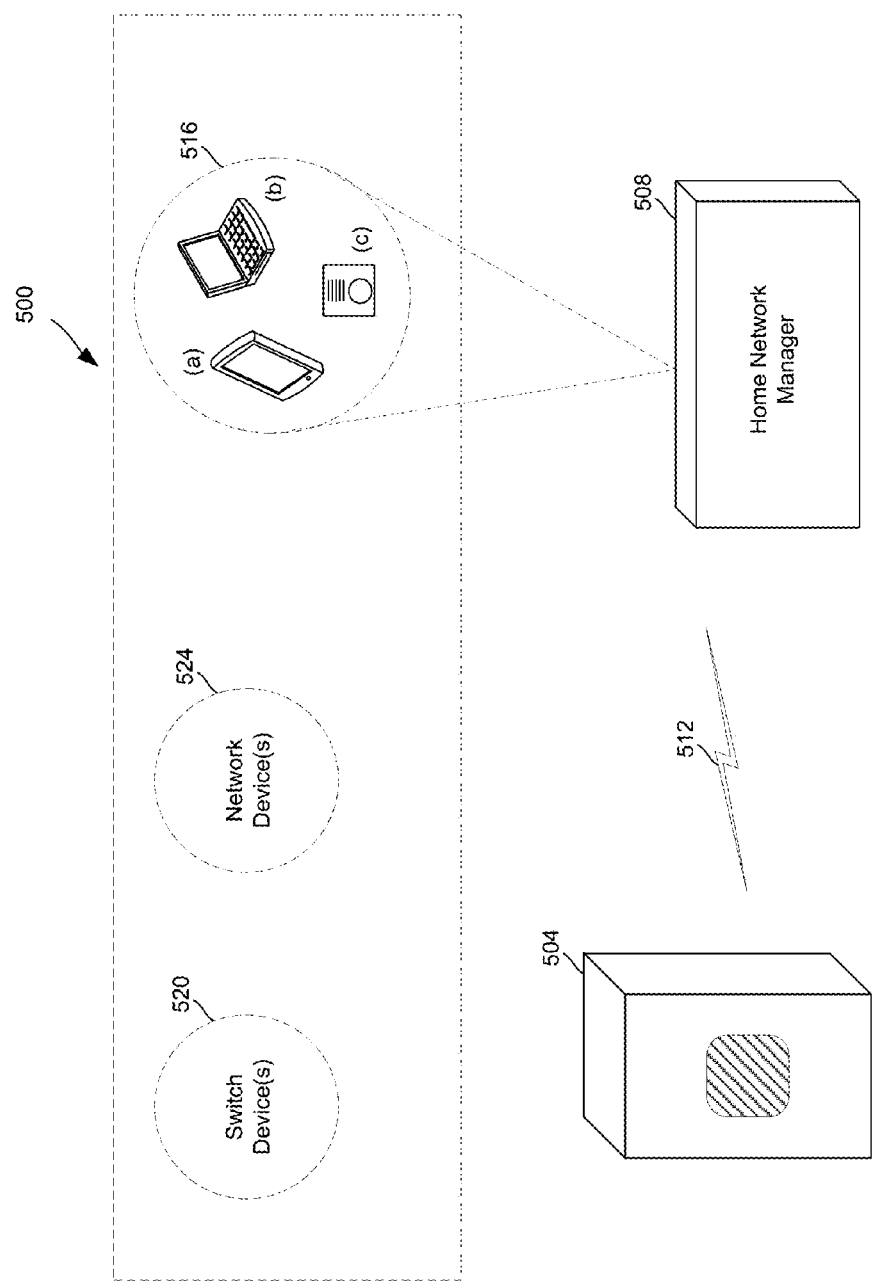
FIG. 5 illustrates example operation of an emergency communication device with an example home network.

(e.g., turn on light over a dinner table, turn off TVs), or, as shown in FIG. 5, click three times for an "emergency scene" (e.g. to provide security).

The disclosure is not limited to any type of devices that an emergency communication device may control. Furthermore, the disclosure is not limited to any particular scene or sequence of events that may be activated and/or initiated by operation and/or functionality of the emergency communication device. It is to be understood that the type of devices to be controlled, the setting on the devices and/or any scenes may be preprogrammed, preconfigured and/or otherwise customized based on the desired outcome.

In an example embodiment of the disclosure, operation of an emergency communication device (e.g., the emergency communication device 400 of FIG. 4) may trigger operation of another network device (e.g., network device 120*a*-120*o*) or a network manager (e.g., home network manager 110 of FIG. 1). For example, when an emergency communication device is activated, operation of one or more other network devices (e.g., network device 120*a*-120*o*) and/or one or more network managers (e.g., home network manager 110) may be triggered, such that, for example, the one or more network devices and/or one or more network managers may operate one or more devices that may be associated with the one or more network devices and/or the one or more network managers (e.g., when the gate of location 101 is opened, the lights 120*e* on the front and/or back porch turn on, a message is generated by a home network manager 110, such as, for example, a text message to be delivered to a computer 120*b* and comprising an alert that a front gate is now open).

The emergency communication device 400 may comprise one or more input interfaces, for example, one or more mechanical interfaces (e.g., buttons), one or more touch sensitive interfaces, one or more environmental interfaces (e.g., surrounding sensing), one or more near-field communication interfaces, (and/or other interfaces) (not shown) either inside or outside of the emergency communication device 400 for providing other basic functionalities. For example, the emergency communication device 400 may comprise one or more interfaces that may be activated (e.g., pressed and/or depressed) sequentially and/or for a predetermined and/or preconfigured about of time to operate one or more functions programmed at the home network manager 110 of FIG. 1. One or more functions of the emergency communication device 400 may comprise range testing (e.g., whether emergency communication device 400 is within a home network), connecting to a home network (e.g., paring between an emergency communication device 400 and a home network through, for example, a network manager) and/or temper prevention.

In an example embodiment of the disclosure the one or more buttons may be located inside of the emergency communication device 400, such that, for example, when the emergency communication device 400 is tampered with (e.g., casing is opened) the button may, for example, become depressed. In this regard, the emergency communication device 400 may generate a temper alarm condition. The condition may be communicated to the home network (e.g., home network 100), to other devices and/or a home network manager (e.g., home network manager 110).

The emergency communication device 400 may comprise one or more visual and/or audible indicators (e.g., LED(s), speaker(s), and/or other interfaces) (not shown) either inside or outside of the housing 404. The one or more visual and/or audible indicators may be used in connection with, for example, providing visual and/or audible cues indicative of, for example, the status of the emergency communication device 400 (e.g., within home network range, connected to a home network, in paring mode) and/or operation the one or more buttons.

The emergency communication device 400 may be configured for operation on a home network (e.g., home network 100 as depicted in and/or described with respect to FIG. 1), such that, the emergency communication device 400 may be utilized as a home network element. In this regard, the emergency communication device 400 may be configured to interact, for example, in a home network (e.g., home network 100 as depicted in and/or described with respect to FIG. 1) with, for example, a home network manager (e.g., home network manager 110).

In an example embodiment of the disclosure, the emergency communication device 400 may comprise one or more input/output ("I/O") interfaces. The I/O interface may comprise suitable logic, circuitry, interfaces, and/or code that may be operable to enable user interactions with the emergency communication device 400 through interfaces, such as, for example, interfaces provided by the example interface device(s) 516(*a*)-(*c*), as shown in, for example, FIG. 5. The I/O interface may obtain input from user(s) of the emergency communication device 400 and/or provide output to the user(s). The I/O interface may support various types of inputs and/or outputs, including, for example, video, audio, and/or textual. In this regard, dedicated I/O devices and/or components, external to or integrated within the emergency communication device 400, may be utilized for inputting and/or outputting data during operations of the I/O interface. Exemplary (external or integrated) I/O devices may comprise displays, mice, keyboards, touchscreens, voice input interfaces, and other input/output interfaces or devices.

The example interface device(s) 516*a-c* may, for example, provide a graphical user interface (GUI) for controlling the operation of one or more emergency communication devices (e.g., emergency communication device 400) and/or controlling and/or monitoring one or more control devices (e.g., switch device(s) 520 and network device(s) 524 of FIG. 5) associated with the one or more of the one or more emergency communication devices.

In an example embodiment of the disclosure, the emergency communication device 400 may be operable to communicate with a network manager (e.g., home network manager 110). The emergency communication device 400 may communicate, to the network manager, information and/or data relating to, for example, status of the emergency communication device 400, one or more emergency communication devices may be linked, controlled and/or monitored by and/or connected to another emergency communication device. The communications may comprise status information, predefined and/or predetermined conditions and/or any other information that may be relevant to the operation of one or more emergency communication devices 400 of a home network. The status and/or predefined and/or predetermined conditions may comprise status and/or alarm conditions associated with operation of one or more emergency communication devices.

In an example embodiment of the disclosure, the emergency communication device 504 may incorporate a wireless range tester (not shown) that may be operable to, for example, determine whether the emergency communication device 400 is within a range of a home network manager (e.g., home network manager 110) and/or other network element. In this regard, the emergency communication device 400 may be operable to generate an alarm condition when the emergency communication device 400 is not within a range of any home network manager (e.g., home network manager 110) and/or other network element and/or when the emergency communication device 400 that, for example, was previously within the range of a (e.g., home network manager 110) and/or other network element, is now outside of that range. In an example embodiment of the disclosure, the alarm condition may active one or more alarm indicators to generate an alarm condition by, for example, generating an audible and/or a visual alarm.

In another example embodiment of the disclosure, wireless range tester may indicate whether the emergency communication device 400 is in range, is in an intermediate range and/or is out of range of a home network manager. The in range indication may, for example, be associated with a condition where the emergency communication device 400 may establish a direct connection with a home network manager (e.g., home network manager 110) and whether or not a direct communication is desirable (e.g., the emergency communication device 400 may, for example, communicate with the home network manager utilizing other network elements although a direct communication would be possible). The in an intermediate range condition may, for example, be associated with a condition where the emergency communication device 400 may not establish a direct connection with a home network manager (e.g., the home network manager 110) but may establish an indirect communication with the home network manager (e.g., through other network elements). The out of range indication may, for example be associated with a condition where the emergency communication device 504 may not be able to establish either a direct and/or in direct communication with a home network manager (e.g., the home network manager 110).

In an example embodiment of the disclosure, the emergency communication device 400 may indicate whether the emergency communication device 400 is in range (e.g., direct, indirect) and/or out of range through one or more audio and/or visual indicators. The indicators may be, for example, integrated with and/or external to the emergency communication device 400. For example, the emergency communication device 400 may comprise an external visual indicator (e.g., LED, RGB, RGBW light) that may be operable to display the status of the emergency communication device 400 with respect to the range through different colors and/or illumination schemes. For example, a visual indicator may display a different color depending on the in-range status (e.g., one color may indicate that the emergency communication device 400 is in a direct range, a second color may indicate that the emergency communication device 400 is in indirect range and/or a third color may indicate that the emergency communication device 400 is out of range). In another example, the visual indicator may blink at different frequencies, illuminate without blinking and/or be operable to display different illumination schemes depending on the in-range status of the emergency communication device.

In another example embodiment of the disclosure, the emergency communication device 400 may activate other light sources (e.g., connected on one or more output and/or hybrid input/output ports of the emergency communication device 400 and/or other light sources connected on the network).

In an example embodiment of the disclosure, the emergency communication device 400 may comprise other suitable circuitry, interfaces, logic, and/or code for implementing various aspects of the present disclosure. For example, the emergency communication device 400 may comprise a memory and/or a processor.

The memory may store, for example, configuration data, which may comprise parameters and/or code, comprising software and/or firmware. The memory may comprise different memory technologies, including, for example, read-only memory (ROM), electrically erasable programmable ROM (EEPROM), random access memory (RAM), low latency nonvolatile memory, flash memory, solid-state drive (SSD), field-programmable gate array (FPGA), and/or other suitable electronic data storage capable of storing data, code and/or other information.

In an example embodiment of the disclosure, the emergency communication device 400 may be operable to receive software and/or firmware updates. For example, the emergency communication device 400 may receive software and/or firmware updates from a network manager (e.g., the home network manager 110). In an example embodiment of the disclosure the software and/or hardware updates may be received, processed and/or installed automatically and/or manually. For example, the process may be completely automatic (e.g., a network manager may send an update to the emergency communication device 400), and/or semi-automatic (e.g., an update may be initiated by a user through, for example, a network manager, and may, for example, be processed by the emergency communication device 400 automatically).

The processor may comprise suitable circuitry, interfaces, logic, and/or code that may be operable to process data, and/or control and/or manage components, operations and/or functions of the emergency communication device 400, and/or tasks performed therein. In this regard, the processor may configure and/or control operations of various components and/or subsystems of the emergency communication device 400, such as, for example, the memory, the communication subsystem (e.g., for communicating with, for example, the home network manager 110) by utilizing, one or more control signals.

FIG. 5 illustrates example operation 500 of an emergency communication device 504 with an example home network manager 508. The emergency communication device 504 may comprise the emergency communication device 400 of FIG. 4, for example. The home network manager 508 may comprise the home network manager 110 of FIG. 1, for example. In the example embodiment shown, the emergency communication device 504 may wirelessly communicate with the home network manager 508 via a communication link 512, such as, for example, a z-wave communication protocol. For example, the home network manager 508 may be programmed to perform one or more actions, in response to receiving a signal from the emergency communication device 504. In some embodiments, statuses of the emergency communication device 504 may also be monitored through one or more interface devices 516, for example, a laptop 516a, a mobile device 516b, or a security device 516c. Also, the home network manager 508 may also be programmed to activate certain devices such as switch devices 520 and network devices 524. In some embodiments, the switch devices 520 may include an actuator (not shown) that opens a door (not shown). In some embodiments, the network devices 524 may include telephony communication devices (not shown) that is programmed to place one or more telephonic or internet messages to a pre-defined recipient, such as, for example, an emergency number.

The disclosure is not limited to any particular type of a communication link. For example, the emergency communication device 504 may be implemented to support, for example one or more wireless and/or wired links, protocols and/or connections. For example, wireless links, protocols and/or connections, may comprise, for example, WPAN (e.g., Bluetooth or ZigBee) and/or WLAN (WiFi/802.11) protocols and/or any other wireless links, protocols and/or connections suitable for implementation consistent with the disclosure. Wired links, protocols and/or connections may comprise, for example, Ethernet, Universal Serial Bus (USB), and/or any other wired links, protocols and/or connections suitable for implementation consistent with the disclosure. While not shown in FIG. 2, to support communication with other elements or systems, such as the home network manager 508, the emergency communication device 504 may incorporate a communication transceiver (e.g., a Z-Wave transceiver) and/or related processing resources for allowing use of the emergency communication device 504.

In an example embodiment of the disclosure, the emergency communication device 504 may provide wired and/or wireless interfaces that may enable one or more network devices to connect to a home network (e.g., home network 100) and/or home network manager (e.g., home network manager 508). For example, if the network manager provides connectivity of various devices to a home network, for example, based on a Z-Wave protocol, the emergency communication device 504 may, for example, contain suitable circuitry, interfaces, logic, and/or code that may enable a particular device that, for example, may not be compatible with the example Z-Wave protocol (and/or any other particular protocol that the network manager supports) to connect to the network manager and/or the home network.

Figure 6:
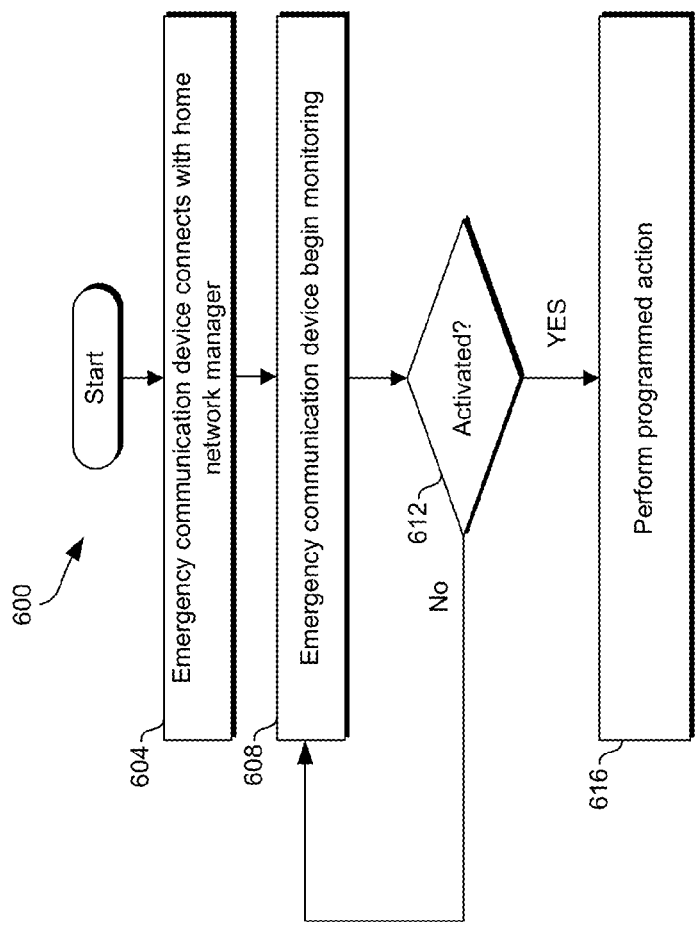
FIG. 6 illustrates an example flow chart of a method for an example process of operation of an emergency communication device.

FIG. 6 illustrates an example flow chart 600 of a method for an example process of operation of an emergency communication device. In the example step 604, after an emergency communication device (e.g., the emergency device 400) has been placed in a desirable location, the emergency communication device may be programmed to connect with a home network manager (e.g., the home network manager 110). In the example step 608, the emergency communication device may begin or continue monitoring if a button (and/or another input interface) has been activated, as determined at the example step 612. For example, the home network manager 110 determines if the panic button 408 (and/or another input interface) of the emergency communication device 400 has been depressed. If the emergency communication device has been activated, as determined at the example step 612, the emergency commination device may cause other devices and/or a home network manager to perform any action. For example, if the home network manager 110 has determined that the panic button 408 (and/or another input interface) of the emergency communication device 400 has been depressed, the home network manager 110 may dial a preprogrammed or predefined emergency number, for example, "911."

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for an emergency communication device.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A device comprising:
a processor configurable to communicate with at least one of a home network manager or associated network elements;
a mechanical button configured to receive a first input and a second input subsequent to the first input, wherein the first input comprises a first click and the second input comprises a second click; and
wherein:
the device is programmable to program a first response corresponding to the first input and a second response corresponding to the second input, wherein the first response is different than the second response, wherein each of the first response and the second response specifies a first action and a second action, respectively, to be activated via at least one of an emergency communication system, the home network manager, or the associated network elements; and
when the mechanical button receives the first input or the second input, the device communicates a corresponding action to at least one of the emergency communication system, the home network manager, or the associated network elements.

2. The device of claim 1, wherein the processor is further configurable to receive data indicative of an operating status of at least one of the home network manager or the associated network elements.

3. The device of claim 1, further comprising a plurality of external ports programmable to be at least one of an input port or an output port.

4. The device of claim 3, wherein at least one of the plurality of external ports is coupled to at least one of the home network manager or the associated network elements.

5. The device of claim 1, wherein:
the mechanical button is further configured to receive a third input subsequent to the second input, wherein the third input comprises a third click;
the device is further programmable to program a third response corresponding to the third input, wherein the third response is different than the first response and the second response, wherein the third response specifies a third action to be activated via at least one of the emergency communication system, the home network manager, or the associated network elements; and
when the mechanical button receives the third input, the device communicates the third action to at least one of the emergency communication system, the home network manager, or the associated network elements.

6. A system comprising:
a plurality of associated network elements;
a home network manager, wherein the home network manager includes a management interface enabling a user to program a first action and a second action to be activated via one or more of the home network manager or associated network elements; and
a device including:
a mechanical button configured to receive a first input and a second input subsequent to the first input, wherein the first input comprises a first click and the second input comprises a second click; and
a communication module configurable to communicate with at least one of the home network manager and the associated network elements;
wherein when the mechanical button receives the first input or the second input, the communication module communicates the first action or the second action, respectively, to the at least one of the home network manager or the associated network elements to carry out the first action or the second action.

7. The system of claim 6, and wherein the panic device further comprises a plurality of external ports programmable through the management interface to be at least one of an input port or an output port.

8. The system of claim 7, wherein at least one of the plurality of external ports is coupled to at least one of the home network manager or the associated network elements.

9. The system of claim 6, wherein:
the home network manager further enables a user to program a third action to be activated via one or more of the home network manager or associated network elements;
the mechanical button is further configured to receive a third input, wherein the third input comprises a third click; and
when the mechanical button receives the third input, the communication module communicates the third action to the at least one of the home network manager or the associated network elements to carry out the third action.

* * * * *